United States Patent
Lisewski et al.

(10) Patent No.: US 10,542,371 B2
(45) Date of Patent: Jan. 21, 2020

(54) SYSTEM AND METHOD FOR PROVIDING CUSTOMIZED POINT-OF-INTEREST INFORMATION

(71) Applicant: Verizon Patent and Licensing Inc., Arlington, VA (US)

(72) Inventors: Kevin Lisewski, Ramsey, NJ (US); Arvind K. Basra, Glen Ridge, NJ (US); Glenna S. Colaprete, Henrietta, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/794,883

(22) Filed: Oct. 26, 2017

(65) Prior Publication Data
US 2019/0132697 A1 May 2, 2019

(51) Int. Cl.
*H04W 24/00* (2009.01)
*H04W 4/02* (2018.01)
*H04W 84/00* (2009.01)
*G06F 3/147* (2006.01)

(52) U.S. Cl.
CPC ............. *H04W 4/02* (2013.01); *G06F 3/147* (2013.01); *H04W 84/005* (2013.01)

(58) Field of Classification Search
CPC .. H04L 29/08108; H04W 64/00; H04W 4/02; H04W 48/04; H04W 4/14
USPC ............... 455/414.1, 456.1–456.6, 457, 466
See application file for complete search history.

(56) References Cited

U.S. PATENT DOCUMENTS

| 8,589,069 | B1* | 11/2013 | Lehman | G01C 21/20 340/995.1 |
| 9,432,421 | B1* | 8/2016 | Mott | H04W 4/025 |
| 2011/0246490 | A1* | 10/2011 | Jonsson | H04W 4/70 707/755 |
| 2014/0121888 | A1* | 5/2014 | Guo | G07C 5/0808 701/31.4 |
| 2015/0191121 | A1* | 7/2015 | Kida | B62K 11/007 340/438 |
| 2015/0220948 | A1* | 8/2015 | Cooper | G06Q 30/0203 705/7.32 |
| 2016/0180395 | A1* | 6/2016 | Rai | G01C 21/3484 701/1 |
| 2018/0349820 | A1* | 12/2018 | Goyal | G06Q 10/02 |

* cited by examiner

*Primary Examiner* — Matthew W Genack

(57) ABSTRACT

Systems and methods described herein may be used to provide users personalized point-of-interest (PoI) information. A context server may cause information, describing PoIs in a particular geographic area, to be sent to a device (e.g., a component of a vehicle, a user device, etc.) communicating with a wireless telecommunication network. The device may individually determine which PoIs to display to the user based on factors such as a current location of the device, an operating status or condition of a vehicle associated with the device, and historical behavior information. The PoIs sent to the vehicles may include a personalized PoI that may be displayed to drivers in a highlighted manner. Additionally, the device may collect driving behavior information relative to the PoIs and/or the personalized PoI and provide the driving behavior information to the context server as feedback.

20 Claims, 11 Drawing Sheets

SYSTEM AND METHOD FOR PROVIDING CUSTOMIZED POINT-OF-INTEREST INFORMATION

BACKGROUND

A wireless telecommunication network may provide one or more network services to mobile devices (e.g., smartphones, wearable devices, laptop computers, vehicles with telecommunication equipment, etc.). An example of such a service may include a mapping service, which may include providing information about a current location of a mobile device, directions to a destination, and information about a given geographic area. In some scenarios, a mapping service may include indicating points-of-interest (PoIs) that may be of interest to users (e.g., parks, libraries, shopping centers, restaurants, movie theaters, hotels, etc.).

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1A:
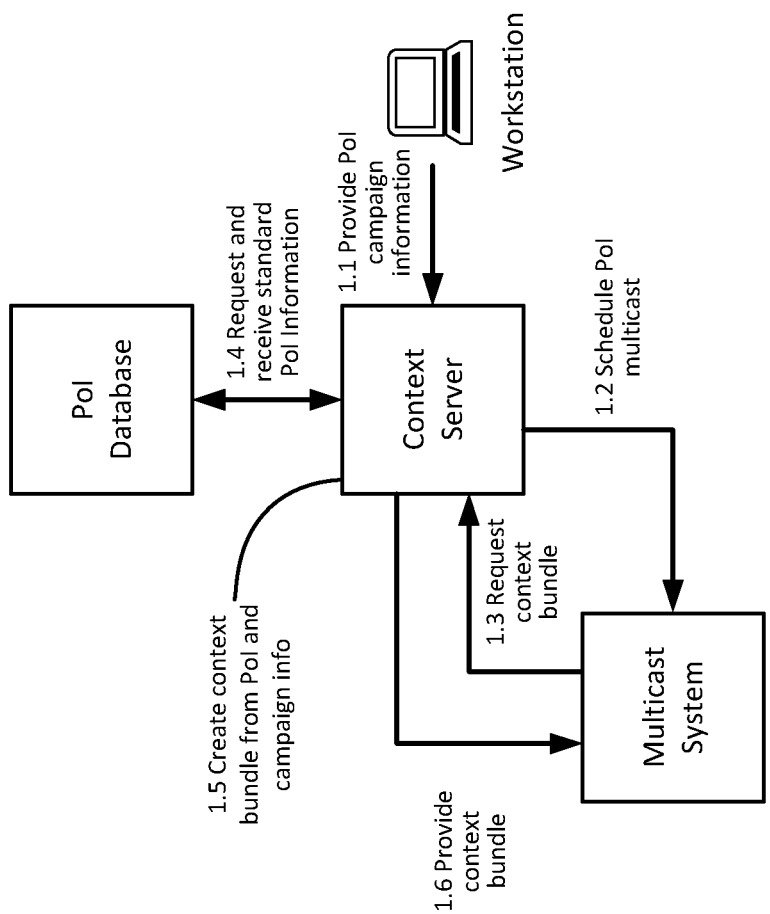
FIGS. 1A and 1B illustrate an example overview of an embodiment described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

The systems and methods described herein may be used to enable vehicles to display customized PoIs to drivers. A PoI may relate to a park, store, commercial center, theater, hotel, government building, and/or another type of geographic location or venue that may be of interest to a driver. A context server may cause PoIs to be periodically sent to vehicles capable of communicating with a wireless telecommunication network. The PoIs sent to a particular vehicle may be based on the geographical area where the vehicle is located and the PoI information currently stored in a PoI database (e.g., without regard to the particular vehicle, operating condition of the vehicle, or driver of the vehicle). As such, all vehicles capable in a given geographic area (e.g., neighborhood, city, county, state, etc.) may receive the same set of PoI information from the wireless telecommunication network. This type of PoI information may be referred to herein as "standard PoI information".

In some scenarios, the PoI information sent to mobile devices may be customized, supplemented, or otherwise modified. The context server may receive a request to initiate a PoI campaign for a particular PoI in a particular geographic area (referred to herein as a "personalized PoI"). The PoI campaign may be an effort to increase an awareness in certain drivers about the personalized PoI, encourage certain drivers to visit the personalized PoI, etc., by causing vehicles to display the personalized PoI to drivers in a highlighted manner. In response to the request for the PoI campaign, the context server may create a context bundle for the PoI campaign, which may include standard PoI information for the geographic area and the personalized PoI The context server may cause the context bundle to be multicasted to all of the vehicles in the geographic area.

Upon receiving the context bundle, vehicles may individually determine which PoIs, described by the context bundle, are of greatest interest to the driver of the vehicle. This may include determining the relevancy of each PoI to a current location of the vehicle, an operating status or condition of the vehicle, and/or information about the past driving behaviors/habits of the driver of the vehicle. In some embodiments, the vehicles may apply a different standard to determining whether to display personalized PoIs, which may result in a personalized PoI being automatically displayed to the driver or more likely to be displayed to the driver. Each vehicle may then cause the PoIs of greatest interest to be displayed to the driver (e.g., via a console screen, heads-up display, etc.).

In some embodiments, personalized PoIs may be displayed in a manner that is highlighted or otherwise more likely to be noticed by the driver (e.g., larger, brighter, etc., than standard PoIs). In some embodiments, vehicles that display personalized PoIs to drivers may monitor and collect information about the driving behavior/decisions of the driver and may provide the collected information to the context server as feedback. The context server may process and format the feedback information from each vehicle into a report that may be sent to the user that initially requested the PoI campaign. The report may, among other things, indicate whether the PoI campaign was effective at motivating drivers to go to the personalized PoI While some of the techniques described herein may be described within the context of a vehicle displaying PoIs to drivers, the techniques may also be applied to other contexts, such as a user with a smartphone, wearable device, tablet computer, Internet-of-Things (IoT) devices, and/or other computing device.

Figure 1B:
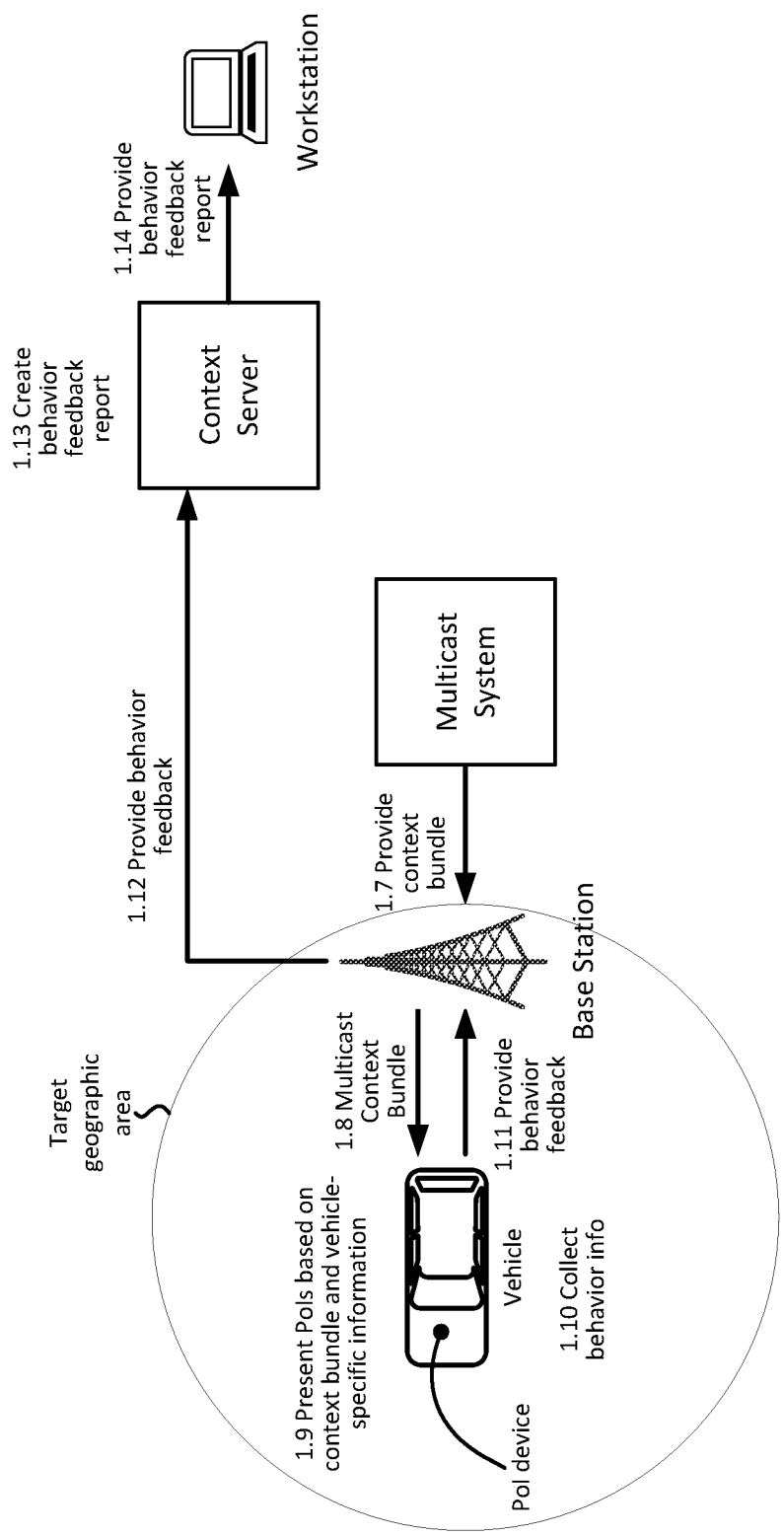

FIGS. 1A and 1B illustrate an example overview of an embodiment described herein. As shown in FIG. 1A, a context sever may receive (at 1.1) PoI campaign information via a workstation (e.g., a smartphone, laptop computer, desktop computer, etc.). The PoI campaign information may include a request for the context server to initiate a PoI campaign. The PoI campaign information may also include a target geographic area (e.g., a town, city, etc.), one or more personalized PoIs (e.g., stores, theaters, landmarks, etc.) in the target geographic area, target driver information (e.g., driver demographic or behavior information), and target vehicle information (e.g., vehicle fault codes, console warnings and other indicators, gauge levels (e.g., gasoline gauge, temperature gauge, etc.), and more). The PoI campaign information may also, or alternatively, include instructions about when vehicles should be notified about the personalized PoIs, how long the PoI campaign is to last (e.g., how long the personalized PoIs should be sent to vehicles), and/or how the personalized PoIs are to be displayed by vehicles (e.g., graphically colored, enlarged, annotated, and/or another type eye-catching way).

In response, the context server may communicate with a multicast system of a wireless telecommunication network to schedule a time for communicating the PoI campaign information to vehicles in the target geographic area (at 1.2). In accordance with the scheduled time, the context server may receive a request, from the multicast system, for a context bundle corresponding to the scheduled PoI multicast (at 1.3). The context server may respond by retrieving, from a PoI database, standard PoI information for the target geographic area (at 1.4). Standard PoI information, as described herein, may include information describing non-personalized PoIs (e.g., stores, theaters, landmarks, etc.) that are each associated with a particular geographic area (e.g., a town, city, etc.). The standard PoI information may include PoIs throughout the particular geographic area, which may include information about each PoI, such as a PoI type (e.g., a store, gym, art gallery, restaurant, park, auto repair shop, etc.), PoI name, days/times when the PoI is available to the public, etc.), and more.

The context server may create a context bundle based on the standard PoI information and the PoI campaign information (at 1.5). As such, the context bundle may include the regular PoIs associated with the target geographic area described by the PoI campaign information, in addition to the personalized PoIs, target driver information, target vehicle information, and instructions for highlighting the personalized PoIs, etc. Upon creating the context bundle, the context server may provide the context bundle to the multicast system (at 1.6).

As shown in FIG. 1B, the multicast system may communicate the context bundle to one or more base stations of a wireless telecommunication network (at 1.7) and/or cause the base stations to multicast the context bundle to vehicles located in the target geographic area (at 1.8). The vehicles may include a software application capable of displaying PoIs to drivers (e.g., via a console screen, heads-up display, augmented reality interface, etc.). For example, the vehicles may have access to an application (which may be installed on a component of the vehicle or on another device (e.g., a mobile device) in communication with a component of the vehicle) that provides a mapping service that may provide a graphical representation of a current location of the vehicle, map of the surrounding area, instructions about how to arrive at a target destination, etc. The mapping service may also be configured to display nearby venues, landmarks, and other types of PoIs that may not have been specifically requested by the driver.

A device (referred to herein as a PoI device) may receive and use the context bundle to display nearby PoIs that are the most relevant to the driver, in addition to performing one or more of the other functions described herein, such as monitoring driver behavior and providing feedback to the context server. The PoI device may include one or more internal components of the vehicle as descried herein (e.g., a control unit, telecommunication component, behavior component, display unit, etc.) or a separate device (e.g., a mobile device) in communication with a component of the vehicle. The PoI device may apply vehicle-specific information to the PoIs described by the context bundle to determine which PoIs to display to the driver (at 1.9). Examples of vehicle-specific information may include a current location of the vehicle, current operating conditions of the vehicle (e.g., vehicle fault codes, warning prompts, gauge levels (e.g., temperature, fuel levels, tire pressure, etc.), driver demographic information (e.g., driver age, gender, etc.), and driver behavior information (e.g., PoIs visited in the past, PoI types frequented most often, common routes for the vehicle to be driven at particular dates/times, etc.). When the PoI device determines that a PoI of the context bundle is probably not of interest to the driver, the PoI device may not display the PoI to the driver. When the PoI device determines that a PoI of the context bundle is likely to be of interest to the driver, the PoI device may display the PoI. Additionally, when the PoI device determines that the personalized PoI is likely to be of interest to the driver, the PoI device may display the personalized PoI in a distinct way (e.g., enlarging a graphical representation of the PoI, highlighting the PoI with a particular color, marking the PoI with a notable icon or graphic (e.g., a "thumbs up" or "smiley face"), etc.).

Additionally, the PoI device may collect behavior feedback information, which may include monitoring whether the vehicle goes to the location of a personalized PoI (at 1.10). The PoI device may provide the behavior feedback to a base station (at 1.11) of the network, and the base station may relay the behavior feedback to the context server (at 1.12). The context server may create a behavior feedback report based on the behavior feedback (at 1.13) and may provide the report to the workstation (at 1.14). The behavior feedback report may aid in determining whether the PoI campaign was effective. For example, the report may indicate the quantity of vehicles that received the context bundle, the quantity of vehicles that displayed the personalized PoI, and vehicle and/or user behavior after the personalized PoIs were presented (e.g., the quantity of vehicles that went to the personalized PoI within a specified period of time, routes taken to travel to the personalized PoI, the quantity of vehicles that did not travel to the personalized PoI, etc.).

Figure 2:
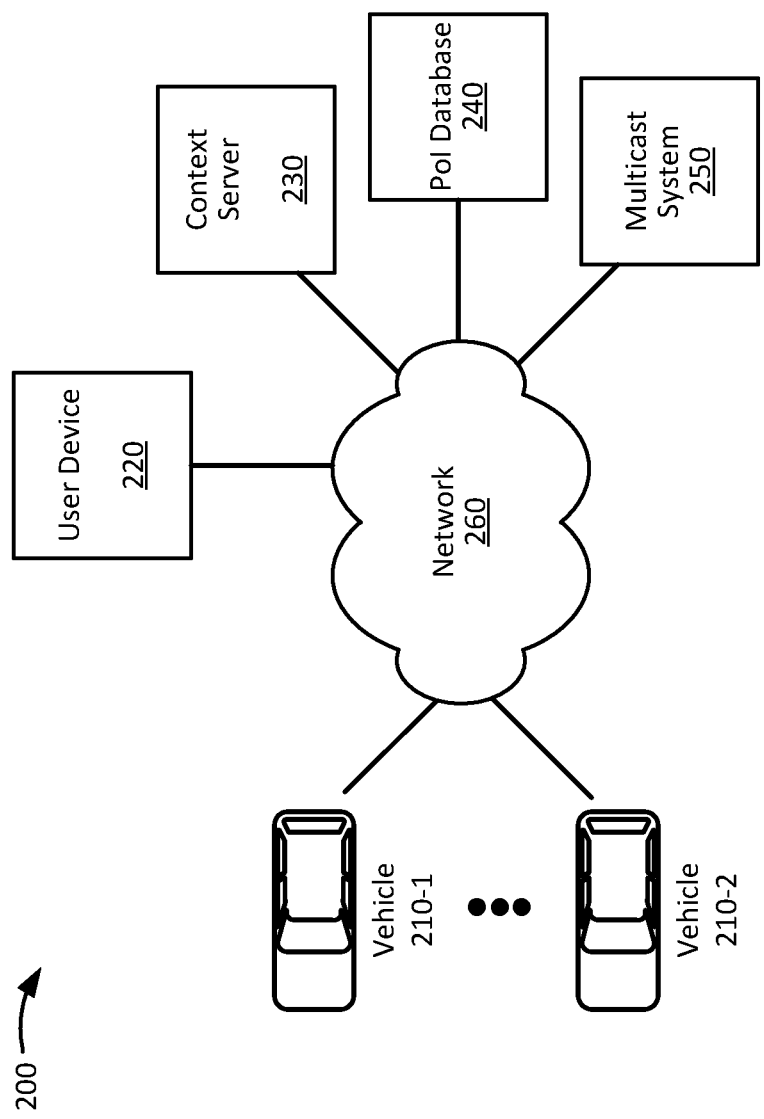
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicles 210 (referred to individually as "vehicle 210" and collectively as "vehicles 210"), user device 220, context server 230, PoI database 240, multicast system 250, and network 260. The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Additionally, devices of environment 200 may interconnect via wired connections, wireless connections, or a combination of wired and wireless connections.

Vehicle 210-1 through vehicle 210-N (collectively referred to herein as vehicles 210, and individually as vehicle 210) may generally represent any vehicle, such as an automobile, truck, bus, motorcycle, boat (or other water craft), etc. Vehicle 210 may include a wireless communications device (or another type of component) that enables vehicle 210 to communicate with network 260 via a Long-Term Evolution (LTE) connection, a Wi-Fi connection, and/or another type of wireless connection. Vehicle 210 may also include other components to monitor, collect, process, and store information about vehicle diagnostics and operating conditions, geographic locations of vehicle 210, driving behaviors of a driver of vehicle 210, and more. Vehicle 210 may also, or alternatively, include components (such as a display device and/or computing device with a processor, memory, software, etc.) to provide a mapping service to the driver of vehicle 210, which may include displaying a current geographic location of vehicle 210, directions to a destination selected by the driver, PoIs in a particular geographic area (e.g., a geographic area surrounding a current location of vehicle 210), etc. Vehicle 210 may also include one or more additional and/or alternative components, examples of which are discussed below with reference to FIG. 3.

User device 220 may include a portable computing and communication devices, such as a personal digital assistant (PDA), smart phone, cellular phone, laptop computer with connectivity to the wireless telecommunications network, a tablet computer, etc. User device 220 may also include a non-portable computing device, such as a desktop computer, consumer or business appliance, smart television, or another device that has the ability to connect to the wireless telecommunications network. User device 220 may also include a computing and communication device that may be worn by a user (also referred to as wearable devices) such as a watch, a fitness band, a necklace, glasses, an eyeglass, a ring, a belt, a headset, or another type of wearable device. User device 220 may be capable of communicating with context server 230, and/or PoI database 240, via network 260. In some embodiments, user device 220 may communicate with context server to initiate PoI campaigns and/or receive PoI campaign feedback. In some embodiments, user device 220 may be used to update standard PoI information stored by PoI database 240 to, for example, better ensure that PoI information sent to vehicles (and other mobile devices) is up-to-date. In some embodiments, the user device 220 may also, or alternatively, receive PoI information as described herein.

Context server 230 may include one or more computation and communication devices that may gather, process, search, store, and/or provide functions and information in a manner described herein. Context server 230 may receive PoI campaign information and create a context bundle based on standard PoI information from PoI database 240 and the PoI campaign information. Context server 230 may communicate with multicast system 250 to cause the context bundle to be communicated (e.g., via multicast or broadcast) to vehicles 210. Context server 230 may also receive behavior feedback information from vehicles 210, consolidate the behavior feedback information into a report, which may be accessed by an administrator (e.g., an administrator who may modify parameters associated with PoI campaigns) or another party.

PoI database 240 may include one or more computation and communication devices that may gather, process, search, store, and/or provide functions and information in a manner described herein. PoI database 240 may store information describing PoIs that are each associated with a geographic area (e.g., a geographic area within a coverage area of network 260). PoI database 240 may receive PoI information from one or more sources, such as an Original Equipment Manufacturer (OEM) of PoI database 240, an operator or network administrator responsible for updating the PoI information, customers of a network service provider that owns and/or operates PoI database 240, etc. In some embodiments, PoI database 240 may use a relational database to store PoI information. In some embodiments, PoI database 240 may include another type of data repository capable of storing PoI information and responding to queries for PoI information.

Multicast system 250 may include one or more server devices that may enable and/or facilitate communicating information (via multicast and/or broadcast) to vehicles 210 via network 260. Multicast system 250 may include a Broadcast Multicast Service Center (BMSC), Multimedia Broadcast Multicast Services (MBMS), Gateway (MBMS GW), Multi-cell/multicast Coordination Entity (MCE), and one or more other systems or devices. Multicast system 250 may provide for the coordination of broadcasting and/or multicasting using MBMS, Enhanced MBMS (eMBMS), Cell Broadcast Service (CBS), and/or another broadcast technique. Multicast system 250 may perform functions relating to scheduling, authorization, charging, and assignment of communication channels for multicast/broadcast purposes. Additionally, or alternatively, multicast system 250 may receive content (e.g., context bundles from context server 230) intended for vehicles 210 located in a target geographic area and may provide the content to appropriate Radio Access Network (RANs) (e.g., base stations, enhanced NodeBs (eNBs), etc.), cause the content to be multicast/broadcast throughout the target geographic area.

Network 260 may include one or more wired and/or wireless networks. For example, network 260 may include a cellular network (e.g., a second generation (2G) network, a third generation (3G) network, a fourth generation (4G) network, a fifth generation (5G) network, LTE network, Global System for Mobile (GSM) network, Code Division Multiple Access (CDMA) network, Evolution-Data Optimized (EVDO) network, or the like), a Public Land Mobile Network (PLMN), and/or another network. Additionally, or alternatively, network 260 may include a local area network (LAN), wireless LAN (WLAN), wide area network (WAN), metropolitan network (MAN), the Public Switched Telephone Network (PSTN), ad hoc network, managed Internet Protocol (IP) network, virtual private network (VPN), an intranet, the Internet, a fiber optic-based network, and/or a combination of these or other types of networks.

Figure 3:
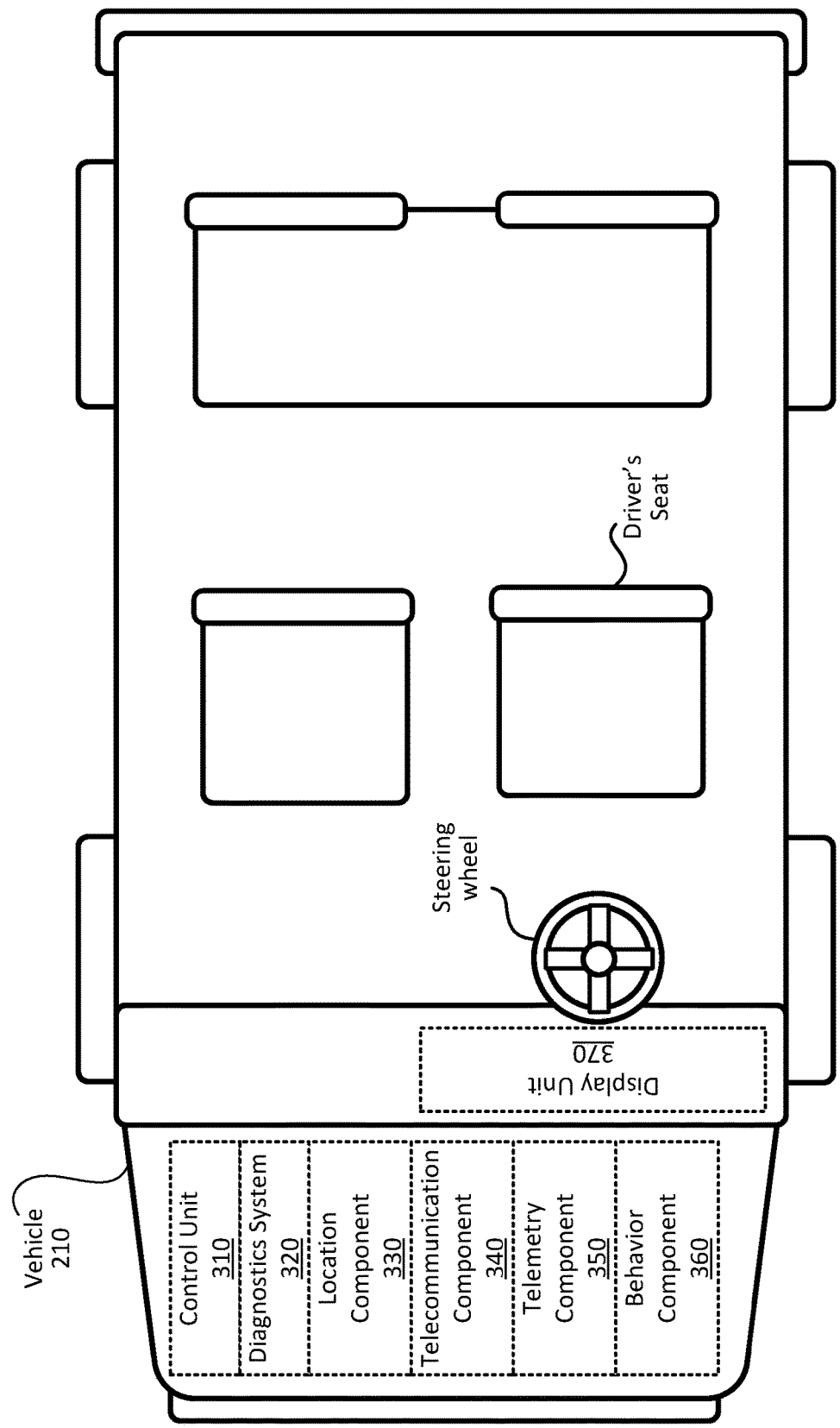
FIG. 3 is a diagram of example components of a vehicle.

FIG. 3 is a diagram of example components of vehicle 210. As shown, vehicle 210 may include various components and/or devices, such as control unit 310, diagnostics system 320, location component 330, telecommunication component 340, telemetry component 350, behavior component 360, and/or display unit 370. In some embodiments, a PoI device, as described above, may be implemented by one or more of the components of FIG. 3 (e.g., control unit 310, telecommunication component 340, behavior component 360, and display unit 370). Additionally, or alternatively, the components and/or devices may be implemented as hardware, software, or a combination of hardware (processor, memory, bus circuitry, etc.) and software.

The quantity of components and/or devices of vehicle 210 is not limited to what is shown in FIG. 3. In practice, vehicle 210 may include additional components and/or devices, fewer components and/or devices, different components and/or devices, or differently arranged components and/or devices than illustrated in FIG. 3. For example, in some embodiments, vehicle 210 may include a storage device capable of collecting and storing one or more of the types of information described herein, including vehicle status information, driver behavior information, user profile information about an owner/driver of vehicle, 210 and more. Also, in some implementations, one or more of the components and/or devices of vehicle 210 may perform one or more functions described as being performed by another one or more of the components and/or devices of vehicle 210. Additionally, devices of vehicle 210 may interconnect via wired connections, wireless connections, or a combination of wired and wireless connections.

Control unit 310 may include a central control unit for vehicle 210, which may gather, process, search, store, and/or provide information. Control unit 310 may communicate with sensor, components, and other devices of vehicle 210 to provide one or more functions. For example, control unit 310 may receive information from diagnostics system 320, location component 330, and/or telecommunication component 340, may process the information into a format suitable for display unit 370, and may cause the information to be displayed to the driver by communicating the information to display unit 370. In another example, control unit 310 may receive (via a user interface device, such as a button, touch-sensitive screen, microphone, etc., of vehicle 210) a request or command from the driver to perform a particular function (e.g., adjust an internal vehicle climate, initiate a mapping service, engage in a call session, etc.), and control unit 310 may take charge of communicating with appropriate components of vehicle 210 and ensuring that the function be performed.

Diagnostics system 320 may include sensors and/or processing circuitry capable of collecting information regarding one or more conditions of vehicle 210 (e.g., temperature, speed, battery capacity, etc.). Diagnostics system 320 may collect information from one or more vehicle sensors (e.g., thermometer, gas monitor sensor, emissions sensor, etc.), convert the information to one or more formats (e.g., to reflect a temperature, volume of gasoline, etc.) and provide the information to another component, such as control unit 310, display unit 370, etc. In some embodiments, the diagnostic system may include and/or operate an on-board diagnostics (OBD) system or similar device for vehicle 210.

Location component 330 may include communication circuitry, processing circuitry, etc., capable of determining a current location of vehicle 210. Location component 330 may be capable of communicating with a Global Positioning System (GPS) network to determine the location of vehicle 210. In some embodiments, location component 330 may provide information describing a current location of vehicle 210 to control unit 310 and/or display unit 370 as part of a mapping service, augmented reality service (e.g., to display PoIs), or another type of service provided by vehicle 210.

Telecommunication component 340 may include communication circuitry, processing circuitry, etc., circuitry capable of communicating with a wireless telecommunication network. For example, telecommunication component 340 may enable vehicle 210 to receive context bundles from a base station of a telecommunication network via broadcast and/or multicast. Telecommunication component 340 may also, or alternatively, enable vehicle 210 to register with and establish a connection with an LTE network. Additionally, or alternatively, telecommunication component 340 may enable vehicle 210 to receive one or more services (e.g., a calling service, messaging service, mapping service, Internet connectivity, etc.) via the telecommunication network.

Telemetry component 350 may include communication circuitry, processing circuitry, etc., that may collect information about the current conditions of vehicle 210 and provide the information to the wireless telecommunication network. Examples of such information may include a current location of vehicle 210, a current speed of vehicle 210, a target destination of vehicle 210, and more. Telemetry component 350 may communicate such information to the telecommunication network via telecommunication component 340. In some embodiments, telemetry component 350 and telecommunication component 340 may enable (or otherwise support) driverless capabilities of vehicle 210.

Behavior component 360 may include communication circuitry, processing circuitry, etc., to gather, process, search, store, and/or provide information as described herein. For example, behavior component 360 may collect and store vehicle-specific information, which may include information about a current location of vehicle 210, an operational status or condition of vehicle 210, and/or driver behaviors/habits (e.g., PoIs and/or PoI types visited by vehicle 210 in the past, dates/times when each PoI was visited, common routes for the vehicle to be driven at particular dates/times, etc.). Additionally, behavior component 360 may receive (via telecommunication component 340) a context bundle from context server 230, apply the vehicle-specific information to the context bundle to determine which PoIs (and/or personalized PoIs) should be displayed to the driver, and provide the resulting PoIs to display unit 370.

Additionally, or alternatively, as vehicle 210 moves from one location to another, behavior component 360 may determine which/whether geographic locations visited by vehicle 210 correspond to a PoI provided in the context bundle and/or displayed to the driver. When behavior component 360 determines that a PoI was visited by the vehicle, behavior component 360 may create a record of the visit, which may include one or more other types of information, such as a timestamp of when the PoI was visited, a condition of the vehicle (e.g., low battery power, an operational error code being presented to the driver, etc.) when the PoI was visited, and so on. Additionally, or alternatively, behavior component 360 may cause the record to be communicated (via telecommunication component 340) to context server 230.

Display unit 370 may include communication, processing, and/or display circuitry capable of receiving information from other components of vehicle 210 and displaying he information to a driver of vehicle 210. Examples of such information that may include error codes, warnings (e.g., low oil, low fuel, limited batter power, etc.), and vehicle gauges (e.g., speedometer, odometer, gas gauge, etc.). Additional examples of such information may include a mapping service that may include a map of the surrounding area, streets, driving dictions (e.g., for arriving at a target location), and/or nearby PoIs. Display unit 370 may include one or more visual interfaces, such as a console screen, in-vehicle, heads-up display, augmented reality (AR) device applied to a windshield of vehicle 210, etc. For example, display unit 370 may cause a sign, symbol, or other graphical indicator to be displayed by a windshield of vehicle 210 (in a manner that does not compromise the driver's field-of-vision or safety). In some embodiments, highlighting a PoI may also include audio, physical (e.g., driver's seat vibrating) or other types of communications directed to the driver of the vehicle.

Figure 4:
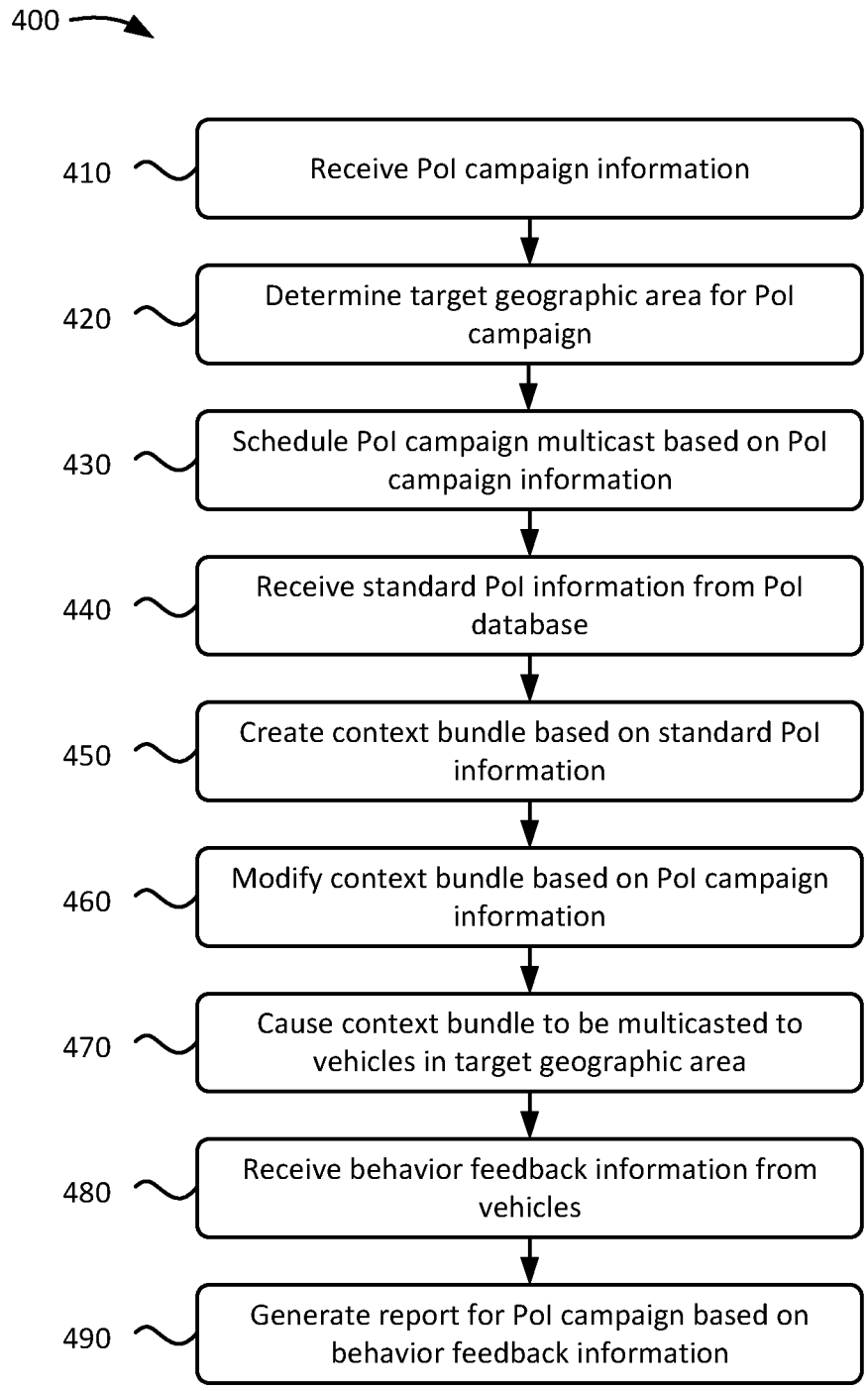
FIG. 4 is a diagram of an example process for providing customized PoI information to a vehicle.

FIG. 4 is a diagram of an example process 400 for providing customized PoI information to a vehicle. Process 400 may be performed by context server 230. In some embodiments, process 400 may be performed by one or more other devices, such as one or more of the devices discussed above with reference to FIG. 2.

As shown, process 400 may include receiving PoI campaign information (block 410). For example, context server 230 may be owned and/or operated by a network service provider, and a customer of the network service provider may contact context server 230 (via user device 220) to request that a particular venue be highlighted as a personalized PoI. The request may include PoI campaign information, such as information about the venue itself (e.g., a name, street address, telephone number, email address, etc.), an indication of why the venue is being sponsored (e.g., a sale, service, or special activity occurring at the venue), and information describing certain types of drivers (e.g., demographic information, behavior information, etc.). The PoI campaign information may also include scheduling information indicating a start and end date/time for the venue to be highlighted and/or information describing a target geographic area (e.g., a neighborhood, town, city, zip code, etc.) for the PoI campaign.

Process 400 may also include determining a target geographic area for a PoI campaign (block 420). As mentioned above, the PoI campaign information received by context server 230 may include an indication or description of a geographic area (e.g., a neighborhood, town, city, zip code, area code, etc.), and context server 230 may determine the target geographic area directly from the PoI campaign information. In some embodiments, context server 230 may be a coverage area, corresponding to one or more base stations, access points, etc., and context server 230 may determine the target geographic area based on geographic information in the PoI campaign information. For instance, the PoI campaign information may indicate that a particular city is the target of the PoI campaign, and context server 230 may determine the target geographic area as base stations, Wi-Fi access points, and/or other types of access nodes that are located in the city and/or have a coverage area that includes some or all of the geographic boundaries of the city. In some embodiments, the target geographic area may be denoted by geographic coordinates (e.g., longitude and latitude coordinates) defining an area. In some embodiments, the geographic coordinates may define a single point and the target geographic area may be determined by applying a radial distance to that point, or another type of modifier (which may result in a polygon or another shape defining the target geographic area).

Additionally, or alternatively, context server 230 may determine the target geographic area based on other information. For example, the PoI campaign information may include a street address, street corner, etc., of the personalized PoI, and context server 230 may determine the target geographic area by applying a preselected measurement scheme (e.g., radial distance) to the street address and determining the target geographic area based on the streets, neighborhoods, cities, area codes, zip codes, etc., within the radial distance of the street address. In such a scenario, the radial distance may be a default distance applicable to all geographic locations or a distance that is particular (i.e., that changes) based on a type of area surrounding the street address. For example, the radial distance may be larger areas that tend to be more congested with vehicles/users (e.g., rural or suburban areas) and smaller for areas that tend to be more congested with vehicles/users (e.g., a metropolitan area, city center, etc.).

Process 400 may include scheduling a PoI campaign multicast based on the PoI campaign information (block 430). A PoI campaign multicast, as described herein, may include a date and time when a context bundle should be communicated (via multicast or broadcast) to vehicles and/or other devices in a geographic area. Depending on the scenario, the context bundle may include standard PoI information that context server 230 has retrieved from PoI database 240, or a combination of standard PoI information that context server 230 has retrieved from PoI database 240 and personalized PoI information that context server 230 has received from user device 220.

To schedule a PoI campaign multicast, context server 230 may notify multicast system 260 that a context bundle is to be communicated to vehicles 210 and/or other devices in the target coverage area. In response, multicast system 260 may designate a date/time for the context bundle to be communicated. In some embodiments, multicast system 260 may be configured to periodically multicast PoI information (e.g., standard PoI information) according a preset schedule, and multicast system 260 may schedule the PoI campaign multicast for the next transmission time as per the schedule.

In some embodiments, multicast system 260 may schedule the PoI campaign multicast at another time (e.g., not in accordance with a pre-set schedule). For example, multicast system 260 may schedule PoI campaign multicast by evaluating factors, such as ongoing and expected multicast/broadcast activities, availability of wireless resources corresponding to the target geographic area (e.g., bandwidth, channel usage, signal interference, etc.), level of congestion (e.g., a quantity of devices located in the target area), and/or amount of information and estimated time required to multicast a context bundle, and determining (based on the factors) a suitable time for performing the PoI campaign multicast.

In some embodiments, context server 230 may indicate a priority level of the PoI campaign multicast, and multicast system 260 may schedule the PoI campaign multicast based on (at least in part) the priority level. For example, multicast system 260 may compare the priority level of a PoI information update with priority levels of ongoing and previously scheduled multicast/broadcast activities, and schedule the PoI information update based on the relative priority level of the PoI campaign multicast (e.g., by scheduling the PoI campaign multicast ahead of multicast activities of lesser priority). The priority level of a particular PoI campaign multicast may be based on the PoI campaign information received by context server 230. For instance, a user requesting the PoI campaign may request that the PoI campaign is of a time-sensitive nature and/or that the PoI campaign be initiated as soon as possible, and context server 230 may assign a relatively high level of priority to the PoI campaign multicast.

Process 400 may also include receiving standard PoI information from PoI database 250 (block 440). For example, based on the target geographic area indicated by the PoI campaign information, context server 230 may query PoI database 250 for standard PoI information. In response, PoI database 250 may provide context server 230 with PoI information associated with the target geographic area. As mentioned above, examples of standard PoI information may include shopping centers, stores, restaurants, movie theaters, hotels, parks, libraries, schools, and other venues that may be of interest generally to any of the drivers/subscribers in the target geographic area. For each PoI, the standard PoI information may include a name of the PoI and one or more types of additional information about the PoI, such as a street address, telephone number, email address, etc.). In some embodiments, the standard PoI information may include additional information, such as hours of operation, pictures, videos, etc., about the Pot In some embodiments, context server 230 may also, or alternatively, determine whether the standard PoI information includes information representing the personalized PoI (e.g., whether the personalized PoI was already registered with PoI database 240 or whether the personalized PoI is a new venue to PoI database 240). Additionally, when the standard PoI information does not include the personalized PoI, context server 230 may update PoI database 240 with the personalized Pot Context server 230 may update the PoI database automatically, in response to a request from a user to do so (e.g., as part of the PoI campaign information), or unless the user requesting the PoI campaign requests that PoI database 240 not be updated with the personalized Pot As such, in addition to retrieving standard PoI information from PoI database 240, context server 230 may help ensure that PoI database 240 includes complete and accurate information about PoIs.

Process 400 may include creating a context bundle based on the standard PoI information (block 450). For instance, context server 230 may create a data structure that includes the standard PoI information that context server 230 retrieved from PoI database 240. The standard PoI information may be limited to PoI information for the target geographic area. Additionally, or alternatively, the context bundle may include an indication of the target geographic area.

Process 400 may include modifying the context bundle based on the PoI campaign information (block 460). For example, context server 230 may update the standard PoI information of the context bundle based on the PoI campaign information received by context server 230. Context server 230 may update the context bundle by creating a new PoI and/or changing an existing PoI in accordance with the PoI campaign information. This may include modifying the context bundle with a name, street address, contact information, hours of operation, etc., for the personalized PoI. Additionally, or alternatively, context server 230 may include information about how the personalized PoI is to be graphically represented or otherwise highlighted to drivers. For example, personalized PoI may be graphically colored, shaded, enlarged, annotated, represented along with a notable image, icon, or other graphic, or otherwise displayed in more eye-catching manner than non-personalized PoIs (i.e., PoIs of the standard PoI information). In some embodiments, context server 230 may also modify the context bundle to include information describing certain subscribers (e.g., demographic information, behavior information, etc.) that may be a target of the PoI campaign.

Figure 5:
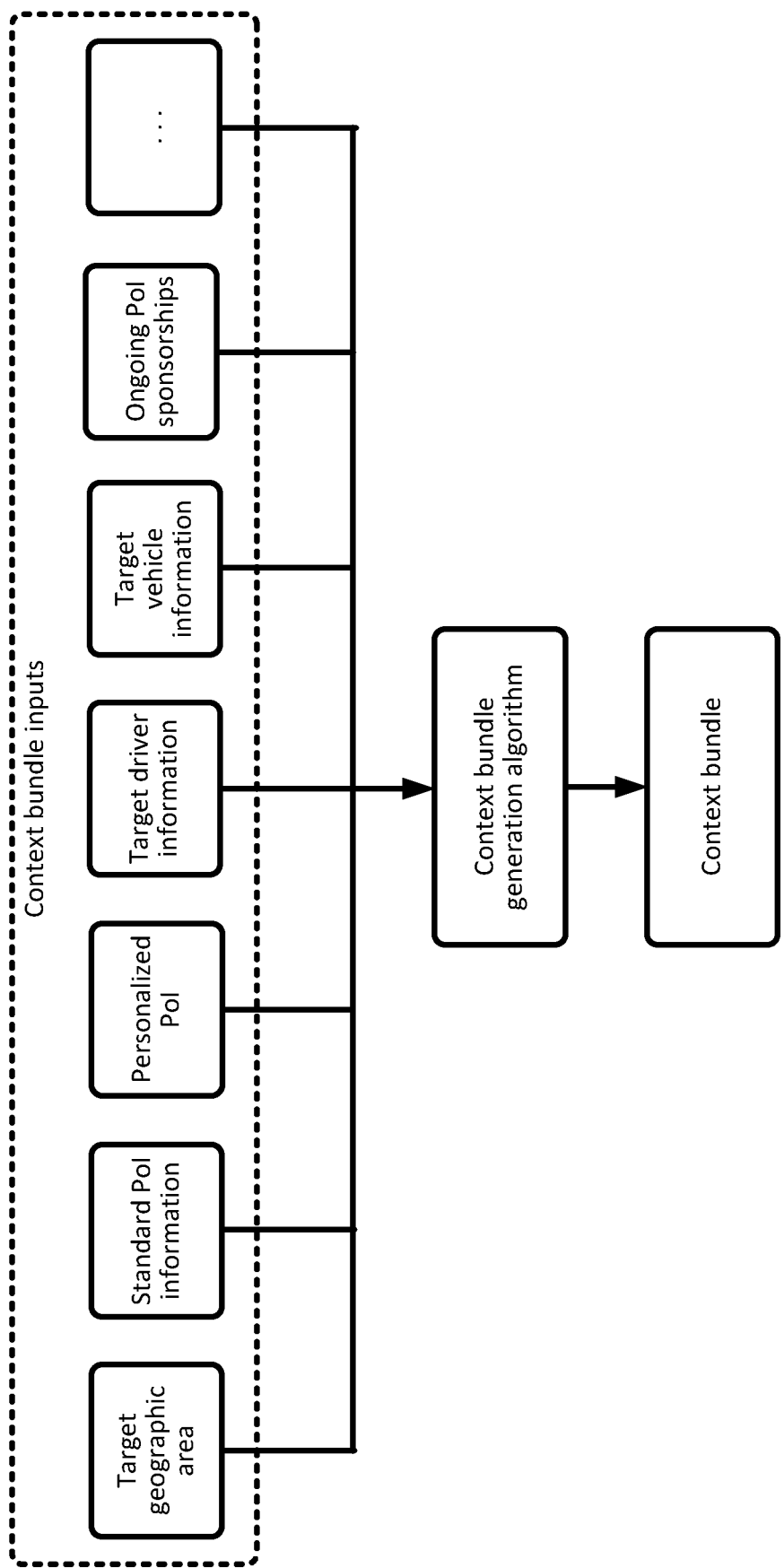
FIG. 5 is a diagram that conceptually illustrates the creation of a context bundle.

FIG. 5 is a diagram that conceptually illustrates the creation of a context bundle. As shown, a context bundle generation algorithm may create a context bundle based on multiple inputs, such as a target geographic area, standard PoI information, personalized PoI, target driver information, ongoing PoI sponsorships, and more. In some embodiments, the context bundle generation algorithm may be installed on context server 230.

The target geographic area for a PoI campaign may be defined by a user when initiating a new PoI campaign. For example, the PoI campaign information received by context server 230 may define a geographic area (e.g., a town, city, state, area code, zip code, etc.), and context server 230 may determine the target geographic area from the PoI campaign information. In some embodiments, each PoI campaign may be limited to only one target geographic area. In some embodiments, the PoI campaign information may identify multiple target geographic areas for a single PoI campaign. For example, a PoI campaign for a chain of restaurants may identify two different cities as target geographic areas of the PoI campaign.

Standard PoI information may include information describing PoIs that have already been registered with, or are otherwise known to, PoI database 240. The standard PoI information may describe commercial centers, stores, gyms, restaurants, landmarks, theaters, hotels, and other locations or venues that may be of interest to drivers/subscribers of a wireless telecommunication network. A personalized PoI may include a PoI that is the subject of a new or ongoing PoI campaign. In some embodiments, a PoI campaign may include multiple PoIs. For example, a PoI campaign may be directed to a chain of gas stations in a particular city. As such, the PoI campaign may include sponsoring each gas station of the chain within the city. Similarly, a PoI campaign that involves multiple target geographic locations may include sponsoring one or more PoIs in each of the target geographic locations.

Target driver information may include information that describes attributes of certain drivers. Examples of such information may include demographic information (e.g., age, gender, ethnicity, etc.) and driving behaviors (e.g., speed, locations, schedule, etc.). Target vehicle information may include information that may describe certain vehicles. Examples of such information may include a make, model, year of manufacture of a vehicle, current operating conditions (e.g., error codes, warning prompts, gauge levels (e.g., gasoline gauge), mileage, etc.).

Ongoing PoI sponsorships may include other (e.g., preexisting) PoI campaigns going on in a particular target geographic location. For example, one user may initiate a PoI campaign for a particular grocery store in a particular city, and while that PoI campaign is ongoing, another user may initiate a PoI campaign for a movie theater in the same city. As such, since the PoI campaign for the grocery store is still going when the PoI campaign for the movie theater begins, a context bundle for the target geographic area (the city) may include PoI campaign information for the grocery store and the movie theater.

Returning to FIG. 4, process 400 may include causing the context bundle to be multicasted to vehicles in the target geographic area (block 470). For example, context server 230 may provide the context bundle to multicast system 260, and multicast system 260 may cause the context bundle to be multicast, broadcast, and/or otherwise transmitted to vehicles 210 in the target geographic area. As described herein, context server 230 may provide the context bundle to multicast system 260 in response to a request from multicast system 260 for a context bundle associated with the target geographic area, and multicast system 260 may send the request to context server 230 in accordance with a scheduled date/time (previously determined by multicast system 250) for communicating the context bundle to vehicles 210 of the target geographic area.

Process 400 may include receiving behavior feedback information from vehicles 210 (block 480). For example, after some time has occurred since the context bundle was provided to one or more vehicles 210, context server 230 may receive behavior feedback information from vehicles 210 that received the context bundle. Behavior feedback information, as described herein, may include locations where the driver has driven vehicle 210. In some embodiments, the behavior feedback information may indicate whether the vehicle displayed the personalized PoI to the driver of the vehicle and how the driver responded. For instance, the behavior feedback information may indicate where vehicle 210 has been driven recently, a time (and/or location of vehicle 210) when the personalized PoI was displayed to the driver, whether the driver went to the personalized PoI within a duration of time measured from when the personalized PoI was displayed to the driver, etc.

In some embodiments, the behavior feedback information may also include an operational status of the vehicle at the time the personalized PoI was being displayed to the driver, demographic information about the driver of vehicle 210, and/or historical driving behavior of the driver. In some embodiments, the behavior feedback information may include information identifying the context bundle received by the vehicle and/or another type of information to enable context server 230 to associate the behavior feedback information with the appropriate PoI campaign.

Process 400 may include generating a report for the PoI campaign based on the behavior feedback information (block 490). For example, context server 230 process, organize, format, etc., the behavior feedback information to create a report that describes whether the PoI campaign was successful (e.g., whether drivers responded to the PoI campaign by going to the personalized PoI). In some embodiments, the report may include various statics regarding the PoI campaign, such as the quantity of vehicles that reported behavior feedback information for the PoI campaign, the quantity of vehicles that displayed the personalized PoI to drivers, the percentage of drivers that went to the personalized PoI during the PoI campaign, a quantity of drivers who went to the personalized PoI without having a history of going to the personalized PoI, a quantity of drivers who went to the personalized PoI despite a history of going to a different PoI of the same type (e.g., store that competes with the personalized PoI), etc. Additionally, or alternatively, context server 230 may communicate the report to user device 220 so that, for example, the user that requested or initiated the PoI campaign may determine how/whether the PoI campaign was effective.

Figure 6:
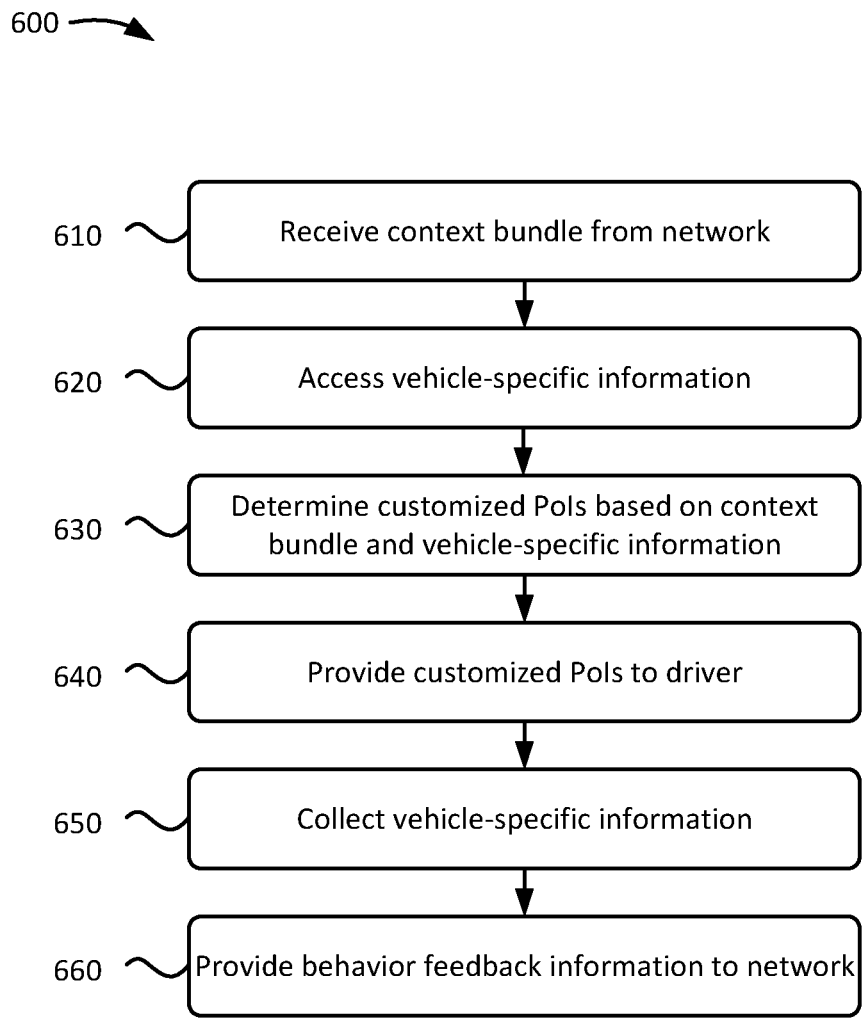
FIG. 6 is a diagram of an example process 600 for providing customized PoI information to a driver.

FIG. 6 is a diagram of an example process 600 for providing customized PoI information to a driver. Process 600 may be performed by one or more components of vehicle 210, such as telecommunication component 340 and/or behavior component 360. In some embodiments, one or more of the operations of process 600 may be performed by one or more additional or alternative components/devices. For example, process 600 may also, or alternatively, be performed by a user device, such as a smartphone, tablet computer, laptop computer, etc. (e.g., a user device that is located within vehicle 210).

As shown, process 600 may include receiving a context bundle from a network (block 610). For example, telecommunication component 340 of vehicle 210, as described above with respect to FIG. 3, may communicate with a base station of a wireless telecommunication network. The base station may multicast a context bundle to vehicles within a coverage area of the base station. Telecommunication component 340 may receive the context bundle from the multicast transmission from the base station and provide the context bundle to control unit 310 and/or behavior unit 360. The context bundle may include non-personalized PoIs (e.g., standard PoI information) and/or personalized PoIs as described herein.

Process 600 may include accessing vehicle-specific information (block 620). For example, behavior component 360 of vehicle 210, as described above with respect to FIG. 3, may monitor, collect, and store several types of information pertaining to vehicle 210 and/or the driver of the vehicle. For example, behavior component 360 may monitor operating conditions of vehicle 210 (e.g., error codes, warning prompts, engine temperature levels, oil levels, battery power levels, gasoline levels, tire pressure, etc.), behavior information (e.g., days, times, routes, and locations where the driver tends to drive), etc. In some embodiments, information collected by behavior component 360 may also include information provided by, and about, the driver, such as a name, home address, work address, age, gender, ethnicity, profession, etc.

Process 600 may also include determining customized PoIs based on the context bundle and vehicle-specific information (block 630). For example, behavior component 360 of vehicle 210 may determine which PoIs, included in the context bundle, are most likely to be visited by the driver of vehicle 210. In some embodiments, behavior component 360 may do so by comparing the PoIs indicated in the context bundle, and information describing the PoIs, to the operational conditions of vehicle 210 and/or the behavior information of the driver. In some embodiment, (e.g., where example process 600 is performed by a user device) information about an owner/driver of vehicle 210 may be stored by the user device.

Figure 7:
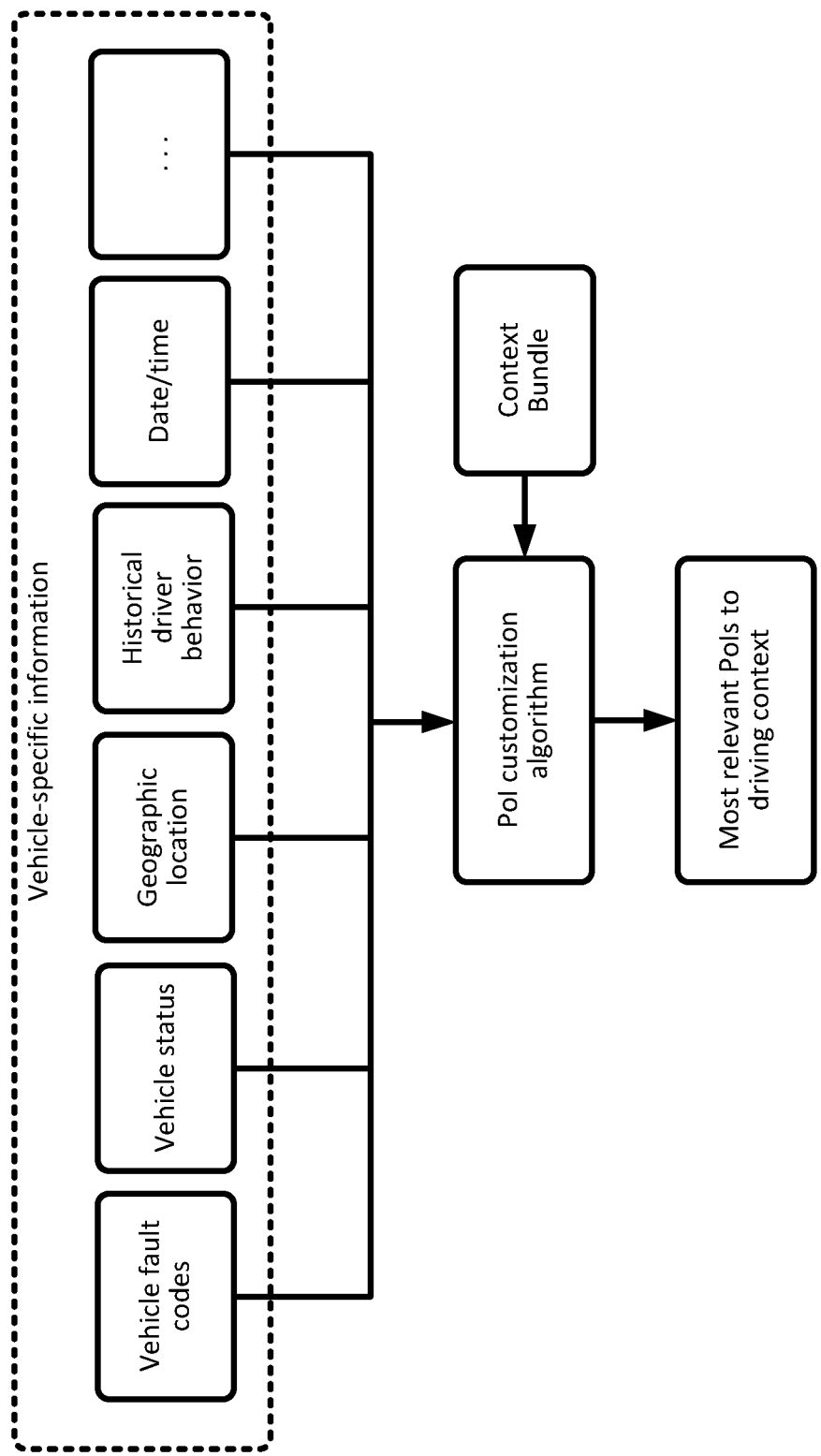
FIG. 7 is a diagram of an example of determining which PoIs are most relevant to a driver.

FIG. 7 is a diagram of an example of determining which PoIs are most relevant to a driver. Vehicle-specific information may include vehicle fault codes, a current status and geographic location of vehicle 210, historical driver behavior and preferences, a current date/time relative to dates/times of driving patterns and location often visited, and more. As shown, PoI customization algorithm may determine PoIs that are most relevant to a particular driving context based on a context bundle and vehicle-specific information. In some embodiments, behavior component 360 of vehicle 210 may include and/or execute the PoI customization algorithm. In some embodiments, the PoI customization algorithm may be part of, and/or executed by, another one or more components of vehicle 210. Additionally, or alternatively, behavior component 360 of vehicle 210 may be continually collecting, processing (e.g., organizing, formatting, evaluating, etc.), and storing one or more types vehicle-specific information in order to, for example, better ensure that vehicle 210 is capable of best determining which PoIs are likely to be of greatest relevance to the driver.

A vehicle fault code may include an indication, from a self-diagnostic and reporting capability of vehicle 210, that a component, device, or system of vehicle 210 is not operating properly. A vehicle fault code may indicate a problem with a system or device relating to location component 330, diagnostics system 320, control unit 310, telecommunication component 340, telemetry component 350, behavior component 360, display unit 370, the engine, emissions system, electrical system, and/or another aspect of vehicle 210. Additionally, or alternatively, a vehicle fault code may include an OBD code, including an OBD 1.5 and/or OBD-II code.

Vehicle status information may include a current speed, acceleration, etc., of vehicle 210. Vehicle status information may include an operational status of a component, device, or subsystem of vehicle 210 (which may not be addressed by a fault code). Examples of such information may include warning prompts, temperature levels, fluid levels (oil, gasoline, antifreeze, etc.), battery power levels, gasoline levels, tire pressure, and other conditions that may help indicate an overall status of vehicle 210. Geographic location information may include a current geographic of vehicle 210 and previous geographic locations (with corresponding timestamps) of vehicle 210. Historical driver behavior may include information representing how the driver has acted/responded to a previous scenario involving vehicle 210 (e.g., a location of the vehicle and/or an operational status of vehicle 210), and date/time information may include a date and time associated with one or more types of vehicle-specific information.

Vehicle-specific information may be aggregated in one or more ways to better determine whether a particular PoI may be of interest to the driver in a given scenario. For example, vehicle status information, historical driver behavior information, and date/time information may be aggregated to indicate that the driver tends to visit a gas station relatively soon (e.g., within a particular duration of time, and/or within a particular driving distance) after the gasoline gauge drops below half full. This information may be further aggregated with geographic location information to determine whether the driver has a preferred gas station or chain of gas stations. As another example, vehicle status information, historical driver behavior information, and date/time information may be aggregated to indicate that the driver tends to visit an auto repair shop for an oil change every 5,000 miles. As another example, vehicle fault codes, geographic location information, and date/time information may be aggregated to determine where the driver tends to go for auto repair services.

The vehicle-specific information may be used to determine whether the driver may be interested in a particular Pot. For instance, if the driver tends to buy gas when the gas tank is half full, PoI customization algorithm may determine that nearby gas stations are particularly relevant PoIs if/when the gas gauge dips below half full. Further, the relevancy of a particular gas station may increase if/when the gas station corresponds to a gas station or a chain of gas station that the driver often frequents. In some embodiments, vehicle 210 may determine whether a PoI is of particular significance, relevance, etc., to a driver based on how often the driver visits the PoI within a particular span of time. For instance, vehicle 210 may store a frequency threshold (e.g., once a week, once a month, twice in the last three weeks, etc.) for determining whether a PoI is of particular interest to the driver. As such, when the context bundle includes a particular PoI (which may be a PoI of a particular location, a PoI corresponding to a particular company or organization, or a type or PoI), vehicle may determine whether the PoI is of particular relevance to the driver by determining whether the driver has visited that PoI (or PoI chain or PoI type) a quantity of times that exceeds the threshold. As such, vehicle-specific information may be aggregated to better understand how a driver may behave in a particular context and determine which PoIs may therefore be particularly relevant in that context.

Process 600 may include providing customized PoIs to driver (block 640). For example, vehicle 210 may determine which PoIs, of the context bundle, are most relevant for a particular context/situation of the vehicle and driver, and display the PoIs to the driver. In some embodiments, this may include displaying the PoIs via display unit 370 of vehicle 210.

Process 600 may also include collecting vehicle-specific information (block 650). For example, after PoIs are presented to the user, vehicle 210 may monitor, collect, and store vehicle-specific information. Examples of vehicle-specific information are discussed above with reference to FIG. 7. When a PoI provided to the driver includes a personalized PoI, some or all of the information monitored, collected, and stored by vehicle 210 may include behavior feedback regarding the personalized PoI.

Process 600 may include providing behavior feedback information to context server 230 (block 660). For example, when PoIs are provided to the driver, vehicle 210 may determine whether any of the PoIs provided are personalized PoIs. When a personalized PoI is provided to the driver, vehicle 210 may monitor, collect, and store behavior feedback regarding the personalized PoI (e.g., whether the driver visited the personalized PoI, when the driver visited the personalized PoI, an operational status of the vehicle when the driver visited the personalized PoI, etc.). Vehicle 210 may provide the behavior feedback information to context server 230 of the wireless telecommunication network. Additionally, or alternatively, the behavior feedback information may be part of the vehicle-specific information collected by vehicle 210.

Figure 8:
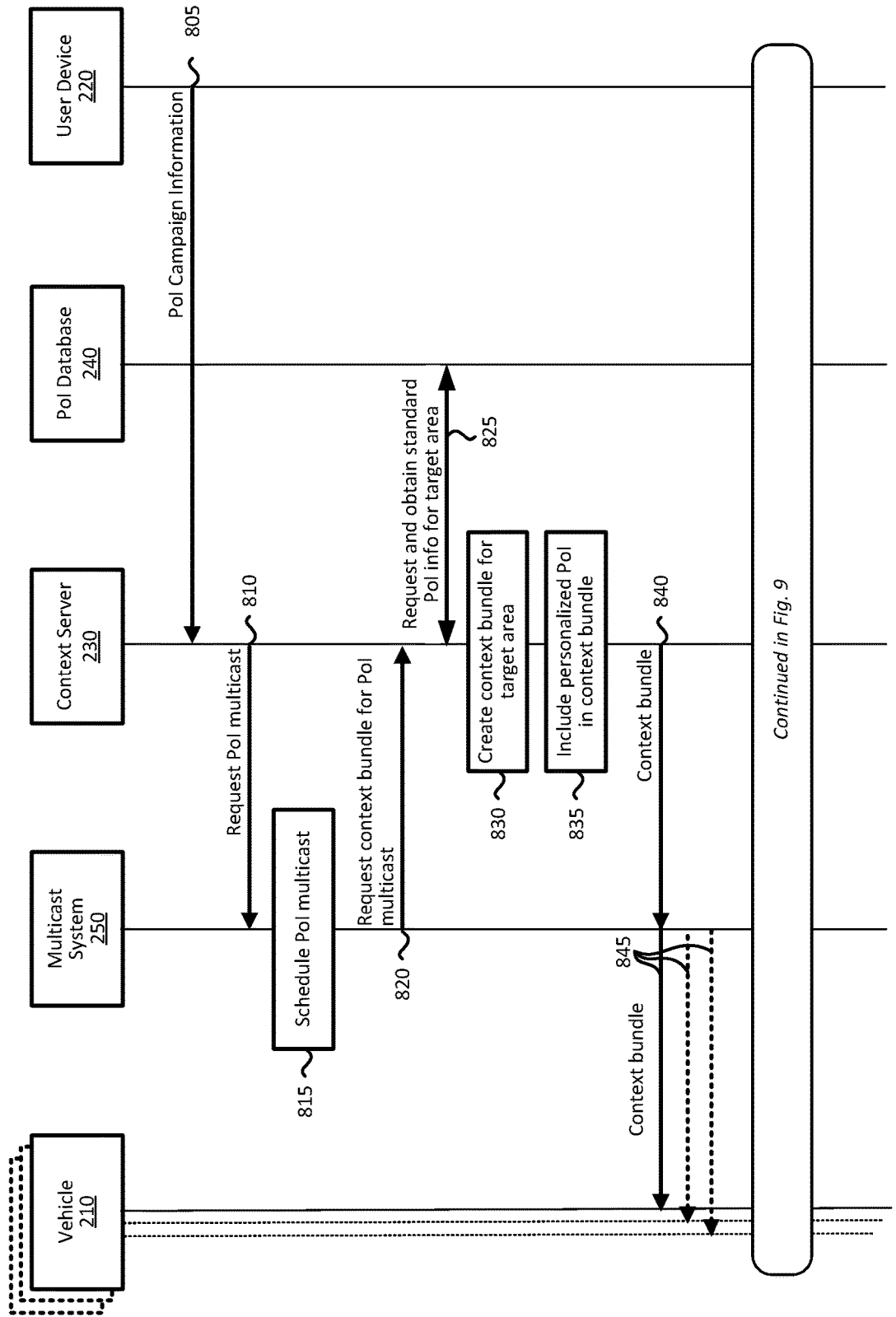
FIGS. 8 and 9 are diagrams of an example for providing customized PoIs that include standard PoIs and personalized PoIs.
Figure 9:
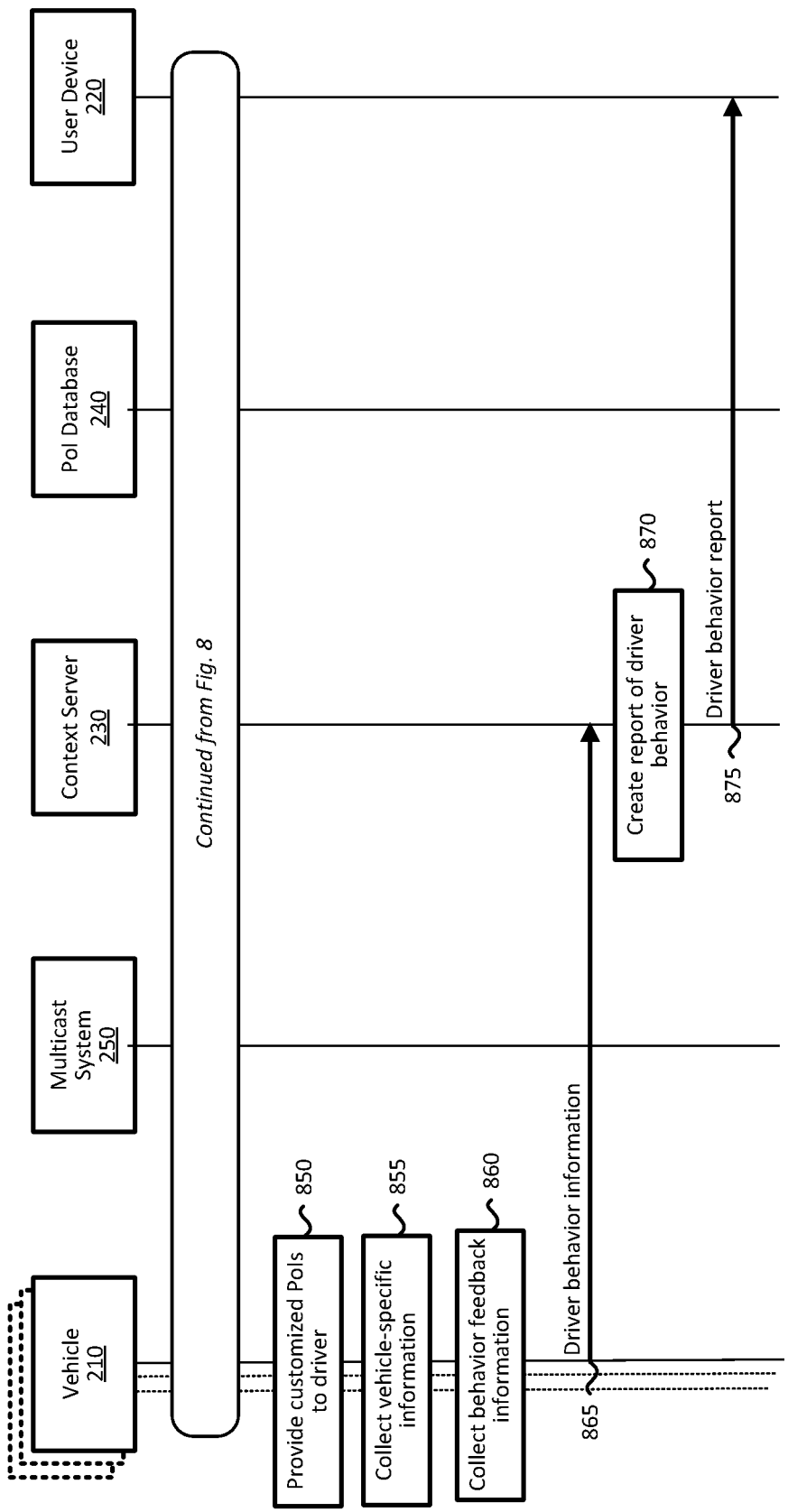

FIGS. 8 and 9 are diagrams of an example for providing customized PoIs that include standard PoIs and personalized PoIs. As shown, the example of FIGS. 8 and 9 may include vehicles 210, user device 220, context server 230, PoI database 240, and multicast system 250. Examples of these devices are discussed above with reference to FIG. 2.

User device 220 may provide PoI campaign information to context server 230 (line 805). In response, context server 230 may send a request, to multicast system 250, for PoI information to be multicast throughout a particular geographic area (e.g., a service area, geographic area, etc., described by the PoI campaign information) (line 810). Multicast system 250 may respond to the request by reserving (or otherwise scheduling) resources for multicasting a context bundle with the PoI information (block 815). In accordance with the schedule, multicast system 250 may send a request to context server 230 for the context bundle (line 820).

Context server 230 may respond to the request by communicating with PoI database 240 to obtain standard PoI information for the target geographic area defined by the PoI campaign information (line 825). Context server 230 may create a context bundle for the target geographic area (block 830). Context server 230 may include a personalized PoI, defined by the PoI campaign information, in the context bundle (block 835). Context server 230 may provide the context bundle to multicast system 250 (line 840), and multicast system 250 may multicast the content bundle, in accordance with the scheduled multicast, to vehicles 210 (and/or user devices) located in the target geographic area (lines 845).

Referring to FIG. 9, vehicle components, such as behavior component 360 and display unit 270, as descried above with reference to FIG. 3, may provide customized PoIs to their respective drivers (block 850). Additionally, as described above with reference to FIGS. 6 and 7, behavior component 360 and display unit 270, may do so by applying vehicle-specific information to the context bundle to determine the PoIs that each driver is most likely to find useful, important, or otherwise relevant. Additionally, behavior component 360 of each vehicle 210 may collect vehicle-specific information (block 855) and behavior feedback information (block 860). The collected vehicle-specific information may later be used by behavior component 360 to determine which PoIs, of a subsequent context bundle, are most relevant to the driver. Additionally, or alternatively, behavior component 360 and telecommunication component 340, of each vehicle 210, may provide the behavior feedback information to context server 230 (line 865). In response, context server 230 may collect the behavior feedback information from vehicles 210, process and compile the behavior feedback information into a report regarding the effectiveness of the overall PoI campaign (block 870), and provide the report to user device 220 (line 875).

Figure 10:
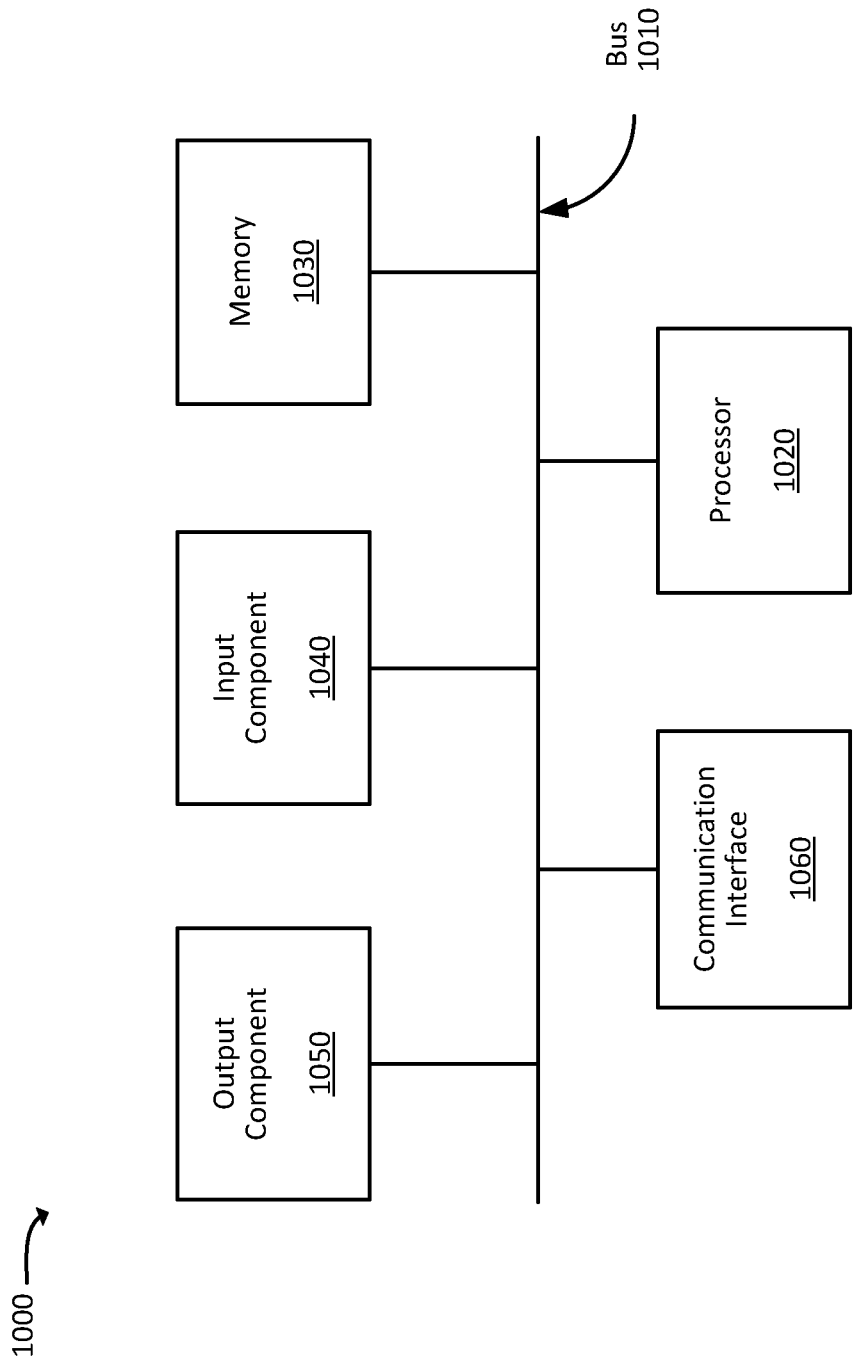
FIG. 10 is a block diagram of example components of a device.

FIG. 10 is a diagram of example components of a device 1000. Each of the components and/or devices illustrated in FIGS. 1A-3, 8, and 9 may include one or more devices 1000. Device 1000 may include bus 1010, processor 1020, memory 1030, input component 1040, output component 1050, and communication interface 1060. In another embodiment, device 1000 may include additional, fewer, different, or differently arranged components. As described herein, a component may be implemented by hardware circuitry, software logic, and/or some combination thereof.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described regarding FIGS. 1A, 1B, and 4-9 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be collected, stored, and used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device integrated in a vehicle, the device comprising:
a display device;
a non-transitory memory device storing a plurality of processor-executable instructions; and
one or more processors configured to execute the processor-executable instructions, wherein executing the processor-executable instructions causes the one or more processors to:
receive, from a wireless telecommunication network, information describing a plurality of points-of-interests (PoIs) corresponding to a current geographic area in which the device and the vehicle are located;
determine a current status of the vehicle, as determined by or received from the vehicle, wherein the current status of the vehicle includes at least one of:
a vehicle fault code, as determined by or received from the vehicle, or
a current operating condition of the vehicle, as determined by or received from the vehicle;
determine historical information regarding the vehicle, the historical information including (a) previous PoIs visited by the vehicle, and (b) a status of the vehicle, as determined by or received from the vehicle, when the vehicle visited the previous PoIs;
select one or more PoIs, of the received plurality of PoIs, to present via the display device, the selecting including determining that (a) the current status of the vehicle, as determined by or received from the vehicle, matches the status of the vehicle included in the historical information, and (b) the current geographic area in which the vehicle is located matches a geographic area of one or more PoIs, of the plurality of PoIs included in the historical information regarding the vehicle, when the vehicle was associated with the status included in the historical information; and
cause the selected one or more PoIs to be displayed via the display device.

2. The device of claim 1, wherein executing the processor-executable instructions further causes the one or more processors to:
determine that the selected one or more PoIs include a first PoI that is personalized for the user and a second PoI that is not personalized for the user; and
cause the personalized first PoI to be displayed to the user in a highlighted manner relative to a manner in which the second PoI, that is not personalized, is displayed to the user.

3. The device of claim 1, wherein the current status of the vehicle includes both of:
the vehicle fault code, and
the current operating condition of the vehicle.

4. The device of claim 1, wherein the historical information regarding the vehicle includes PoIs previously visited by the vehicle with a frequency that exceeds a frequency threshold.

5. The device of claim 1, wherein executing the processor-executable instructions further causes the one or more processors to:
collect, subsequent to causing the determined PoIs to be displayed, information describing a driving behavior of the user of the device, and
communicate the collected information to a context server, via the wireless telecommunication network, wherein communicating the collected information enables the context server to generate a report describing which PoIs, of the plurality of PoIs, were visited by the user.

6. The device of claim 1, wherein:
the plurality of PoIs are part of a context bundle of information multicasted, by the wireless telecommunication network, to devices within the current geographic area of the device, and
a quantity of the selected one or more PoIs is fewer than a quantity of PoIs included in the plurality of PoIs as part of the context bundle.

7. The device of claim 5, wherein the information describing the driving behavior indicates whether the user device visited a particular PoI, of the PoIs, displayed via the display device,
wherein the context server modifies the historical information regarding the vehicle based on whether the user device visited a particular PoI, of the displayed PoIs, wherein the modified historical information is subsequently used to determine another set of PoIs to display via the display device.

8. A non-transitory computer readable medium storing a plurality of processor-executable instructions, wherein executing the processor-executable instructions causes one or more processors of a device, integrated in a vehicle, to:
receive, from a wireless telecommunication network, information describing a plurality of points-of-interests (PoIs) corresponding to a current geographic area in which the device and the vehicle are located;
determine a current status of the vehicle, as determined by or received from the vehicle,
wherein the current status of the vehicle includes at least one of:
a vehicle fault code, as determined by or received from the vehicle, or
a current operating condition of the vehicle, as determined by or received from the vehicle;
determine historical information regarding the vehicle, the historical information including (a) previous PoIs visited by the vehicle, and (b) a status of the vehicle, as determined by or received from the vehicle, when the vehicle visited the previous PoIs;
select one or more PoIs, of the received plurality of PoIs, to present via a display device, the selecting including determining that (a) the current status of the vehicle, as determined by or received from the vehicle, matches the status of the vehicle included in the historical information, and (b) the current geographic area in which the vehicle is located matches a geographic area of one or more PoIs, of the plurality of PoIs included in the historical information regarding the vehicle, when the vehicle was associated with the status included in the historical information; and
cause the selected one or more PoIs to be displayed via the display device.

9. The non-transitory computer readable medium of claim 8, wherein executing the processor-executable instructions further causes the one or more processors to:
determine that the selected one or more PoIs include:
a first PoI that is personalized for a particular user associated with the vehicle, and
a second PoI that is not personalized for the particular user; and
cause the personalized first PoI to be displayed in a highlighted manner relative to a manner in which the second PoI, that is not personalized, is displayed via the display device.

10. The non-transitory computer readable medium of claim 8, wherein the current status of the vehicle includes both of:
the vehicle fault code, and
the current operating condition of the vehicle.

11. The non-transitory computer readable medium of claim 8, wherein the historical information regarding the vehicle includes PoIs previously visited by the vehicle with a frequency that exceeds a frequency threshold.

12. The non-transitory computer readable medium of claim 8, wherein executing the processor-executable instructions further causes the one or more processors to:
collect, subsequent to causing the determined PoIs to be displayed, information describing a driving behavior of a user associated with the device, and communicate the collected information to a context server, via the wireless telecommunication network, wherein communicating the collected information enables the context server to generate a report describing which PoIs, of the plurality of PoIs, were visited by the user.

13. The non-transitory computer readable medium of claim 8, wherein:
the plurality of PoIs are part of a context bundle of information multicasted, by the wireless telecommunication network, to devices within the current geographic area of the device, and
a quantity of the selected one or more PoIs is fewer than a quantity of PoIs included in the plurality of PoIs as part of the context bundle.

14. The non-transitory computer-readable medium of claim 12, wherein the information describing the driving behavior indicates whether the user device visited a particular PoI, of the PoIs displayed via the display device,
wherein the context server modifies the historical information regarding the vehicle based on whether the user device visited a particular PoI, of the displayed PoIs, wherein the modified historical information is subsequently used to determine another set of PoIs to display via the display device.

15. A method, performed by a device integrated in a vehicle, the method comprising:
receiving, by the device and from a wireless telecommunication network, information describing a plurality of points-of-interests (PoIs) corresponding to a current geographic area in which the device and the vehicle are located;
determining, by the device, a current status of the vehicle, as determined by or received from the vehicle,
wherein the current status of the vehicle includes at least one of:
a vehicle fault code, as determined by or received from the vehicle, or
a current operating condition of the vehicle, as determined by or received from the vehicle;
determining, by the device, historical information regarding the vehicle, the historical information including (a) previous PoIs visited by the vehicle, and (b) a status of the vehicle, as determined by or received from the vehicle when the vehicle visited the previous PoIs;
selecting, by the device, one or more PoIs, of the received plurality of PoIs, to present via a display device associated with the vehicle, the selecting including determining that (a) the current status of the vehicle, as determined by or received from the vehicle, matches the status of the vehicle included in the historical information, and (b) the current geographic area in which the vehicle is located matches a geographic area of one or more PoIs, of the plurality of PoIs included in the historical information regarding the vehicle, when the vehicle was associated with the status included in the historical information; and
causing, by the device, the selected one or more PoIs to be displayed via the display device.

16. The method of claim 15, further comprising:
determining that the selected one or more PoIs include a first PoI that is personalized for the user and a second PoI that is not personalized for the user; and
causing the personalized first PoI to be displayed to the user in a highlighted manner relative to a manner in which the second PoI, that is not personalized, is displayed to the user.

17. The method of claim 15, wherein the current status of the vehicle includes both of:
the vehicle fault code, and
the current operating condition of the vehicle.

18. The method of claim 15, wherein the historical information regarding the vehicle includes PoIs previously visited by the vehicle with a frequency that exceeds a frequency threshold.

19. The method of claim 15, further comprising:
collecting, subsequent to causing the determined PoIs to be displayed, information describing a driving behavior of the user of the device, and
communicating the collected information to a context server, via the wireless telecommunication network, as feedback information to enable the context server to generate a report describing which PoIs, of the plurality of PoIs, were visited by the user.

20. The method of claim 19, wherein the information describing the driving behavior indicates whether the user device visited a particular PoI, of the PoIs displayed via the display device,
wherein the context server modifies the historical information regarding the vehicle based on whether the user device visited a particular PoI, of the displayed PoIs, wherein the modified historical information is subsequently used to determine another set of PoIs to display via the display device.

* * * * *